Jan. 20, 1970 J. J. JUSTUS ET AL 3,491,304

CLOSED LOOP SIGNAL SAMPLING APPARATUS

Filed March 23, 1966 8 Sheets-Sheet 1

INVENTORS
JIMMIE J. JUSTUS
ALGIMANTAS H. KAZAKEVICIUS
BY Rolf M. Pitts
ATTORNEY

Jan. 20, 1970 J. J. JUSTUS ET AL 3,491,304

CLOSED LOOP SIGNAL SAMPLING APPARATUS

Filed March 23, 1966 8 Sheets-Sheet 2

INVENTORS
JIMMIE J. JUSTUS
ALGIMANTAS H. KAZAKEVICIUS
BY Rolf M. Pitts
ATTORNEY

Jan. 20, 1970 J. J. JUSTUS ET AL 3,491,304

CLOSED LOOP SIGNAL SAMPLING APPARATUS

Filed March 23, 1966 8 Sheets-Sheet 3

INVENTORS
JIMMIE J. JUSTUS
BY ALGIMANTAS H. KAZAKEVICIUS
Rolf M. Pitts
ATTORNEY

CLOSED LOOP SIGNAL SAMPLING APPARATUS

Filed March 23, 1966 8 Sheets-Sheet 4

INVENTORS
JIMMIE J. JUSTUS
ALGIMANTAS H. KAZAKEVICIUS

BY Roy M. Pitts

ATTORNEY

CLOSED LOOP SIGNAL SAMPLING APPARATUS

Filed March 23, 1966 8 Sheets-Sheet 5

INVENTORS
JIMMIE J. JUSTUS
ALGIMANTAS H. KAZAKEVICIUS
BY Rolf M. Pitts
ATTORNEY

CLOSED LOOP SIGNAL SAMPLING APPARATUS

Filed March 23, 1966 8 Sheets-Sheet 6

INVENTORS
JIMMIE J. JUSTUS
ALGIMANTAS H. KAZAKEVICIUS
BY Roy M. Pitts
ATTORNEY

INVENTORS
JIMMIE J. JUSTUS
ALGIMANTAS H. KAZAKEVICIUS
BY Rolf M. Pitts
ATTORNEY

INVENTORS
JIMMIE J. JUSTUS
ALGIMANTAS H. KAZAKEVICIUS
BY Rolf M. Pitts
ATTORNEY 3,491,304

CLOSED LOOP SIGNAL SAMPLING APPARATUS

Jimmie J. Justus, Placentia, and Algimantas H. Kazakevicius, Fullerton, Calif., assignors to North American Rockwell Corporation, a corporation of Delaware Continuation-in-part of application Ser. No. 372,455, June 4, 1964. This application Mar. 23, 1966, Ser. No. 540,136
Int. Cl. H03k 5/00
U.S. Cl. 328—151 11 Claims

ABSTRACT OF THE DISCLOSURE

Closed loop peak detection means for generating a D-C signal indicative alternatively of a peak input amplitude of one polarity and a minimum amplitude input of a second polarity. The forward loop of the closed loop arrangement includes unipolar-driving and integrating means which provides a phase inverted output. Periodic clamping means synchronously clamps an input and output of the integrating means periodically to mutually exclusive reference potentials, the polarity of the reference potentials for the output of the integrating means being opposite to the polarity of a unipolar driving direction thereof.

This application is a continuation-in-part of our application Ser. No. 372,455 for Closed Loop Signal Sampling Apparatus filed June 4, 1964, now abandoned.

In the airborne use of radar systems and like sensors for terrain avoidance applications, control signals are generated in response to sensed terrain for control of an aircraft or the like for either a pilot's display (where the vehicle is manually controlled) or for automatic control of the vehicle. The successful performance of such control function requires the generation alternatively of a maximum upward maneuvering signal indicative of a worst one of a plurality of terrain obstacles in view, and a minimum downward maneuvering signal whereby such worst obstacle may yet safely be avoided. In other words, in response to a periodic radar signal, representing a profile of terrain along a selected flight path, it is desired to provide a bipolar D-C signal having either a maximum magnitude of one polarity or a minimum magnitude of another polarity.

Prior art peak detectors are nominally open-loop unipolar devices, providing only unipolar signals indicative of a peak occurring in one polarity only. In other words, such prior devices do not provide a bipolar output which is indicative alternatively of a minimum input signal of one sense and a maximum input signal of a second or opposite sense.

Further, such open-loop prior art devices are of limited effectiveness or sensitivity to narrow pulsewidths or radar signals from targets of small radial extent, where the peak detector is subjected to signals of varying pulsewidths indicative of targets of varying radial extent. In such prior are peak detectors, D-C peak detection of pulsed inputs is done as an averaging technique. The average output, being a function of the pulse amplitude, is deemed indicative of the peak amplitude. However, such average amplitude is also a function of the time duration of such peak amplitude, which duration may be very short.

Accordingly, a second disadvantage of such prior art device is that a low average amplitude response of the sensing element or capacitor may often be below the threshold of the output element or amplifier, as to provide little or no output indication.

Moreover, such prior art unipolar devices, being open-loop arrangements, are particularly sensitive to the effects of component aging (e.g., performance drift due to changes in the components of the device occurring over the life thereof).

The concept of the subject invention provides an improved sampling peak detector by means of a novel closed-loop arrangement.

In a preferred embodiment of the subject invention, there is provided a closed loop input voltage peak detector for providing a bipolar output voltage, comprising unipolar-driving and integrating means for generating a phase-inverted output. There is also provided periodic signal clamping means for synchronously clamping the input and output of the integrating means periodically to mutually exclusive reference potentials, the polarity of the reference potential for the output of the integrating means being opposed to the polarity of the unipolar driving direction of the integrating means.

By means of the above described arrangement, the integrator is cyclically biased and then driven unidirectionally in response to a closed loop error voltage of a preselected sense, such that the occurrence of the subsequent closed-loop error voltage during the sampling period corresponds to the generation of an output voltage indicative alternatively of the desired input maximum of one polarity (or sense) and input minimum of a second sense. The response of such signal-sampling arrangement is not easily threshold-limited because of the closed-loop operation of the integrator. Further, such closed-loop response is less sensitive to component tolerances and component aging. Accordingly, it is an object of the subject invention to provide improved signal sampling means.

It is another object of the subject invention to provide closed-loop signal sampling means.

It is yet another object of the subject invention to provide signal sampling means for generating a signal indicative of a sampled input having a minimum amplitude of one sense.

It is still another object of the invention to provide signalling means generating a signal indicative alternatively of a sampled input having a minimum amplitude of one sense and a sampled input having a peak amplitude of a second sense.

These and other objects of the subject invention will become apparent from the following specification taken in conjunction with the accompanying drawings in which.

In the figures, like reference characters refer to like parts.

Figure 1:
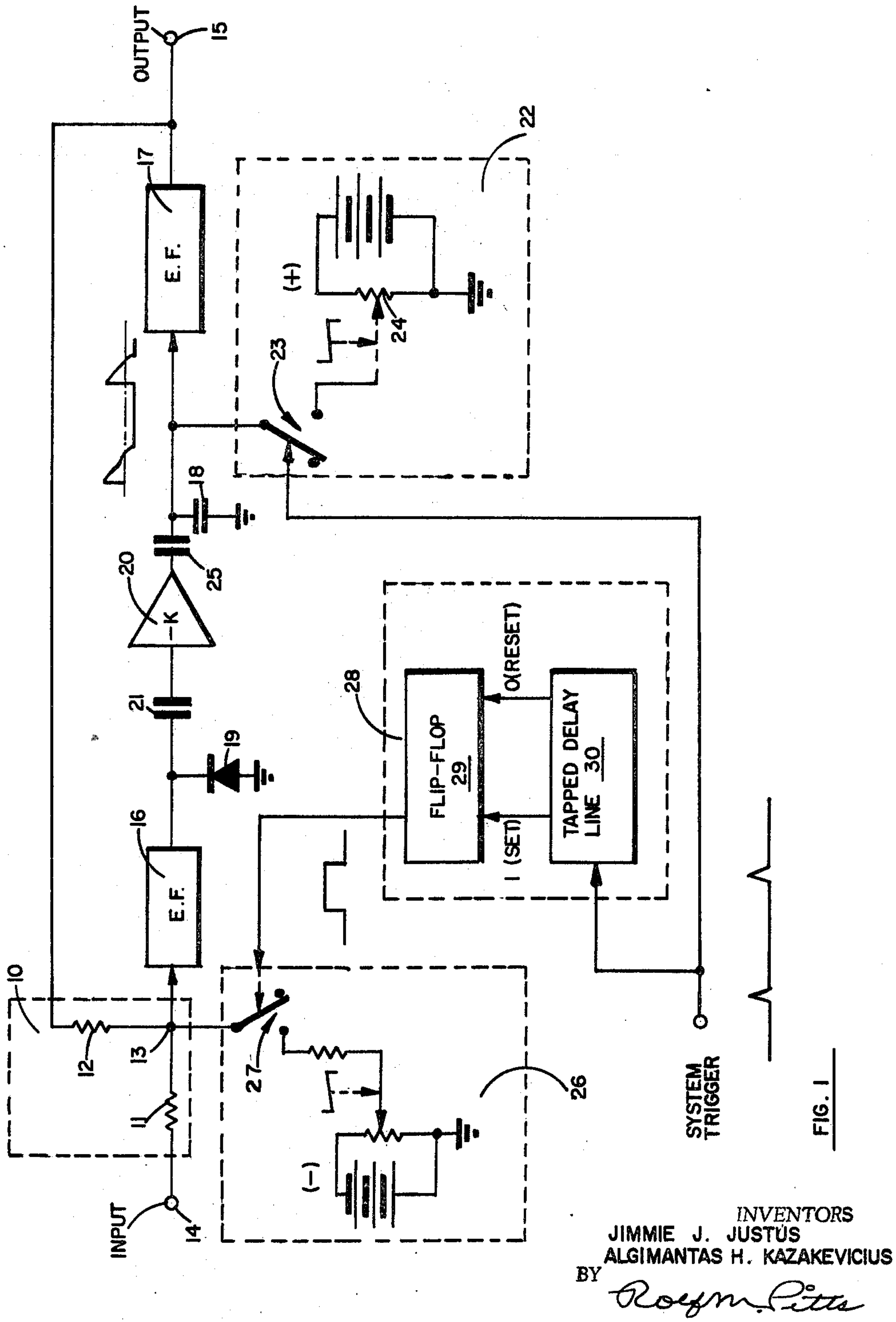
FIGURE 1 is a schematic arrangement illustrating a concept of the invention.

Referring now to FIG. 1, there is illustrated a schematic arrangement of a concept of the invention.

There is provided a signal summing means 10 comprising first and second summing resistors 11 and 12 having respective first terminals interconnected to provide a signal summing point 13, a second terminal 14 of first resistor 11 comprising an input terminal. The second terminal of second summing resistor 12 is connected to an output terminal 15. There is also provided a first and second emitter-follower 16 and 17 for impedance isolation purposes, an input of first emitter-follower 16 being coupled to the output 13 of signal summing means 10, and an output of second emitter-follower 17 being coupled to the output terminal 15.

A shunt-connected capacitor 18 provides signal integrating means responsive to the output of first emitter-follower 16 for generating a signal indicative of a periodic time-integral of the input thereto, an input of second emitter-follower 17 being connected at the output of integrating means 18. A shunt-connected diode 19 provides unidirectional conducting means interposed between the output of first emitter-follower 16 and the input of integrating means 18. A-C coupled, signal-inverting means, interposed in series circuit between the output of first emitter-follower 16 and the input to integrating means 18, is provided by an inverter-amplifier 20 and series-coupling input capacitor 21 and output capacitor 25. Alternatively, the combined functions of amplifier 20 and capacitor 18 may be provided by an integrating amplifier, as is well understood in the art.

Figure 2:
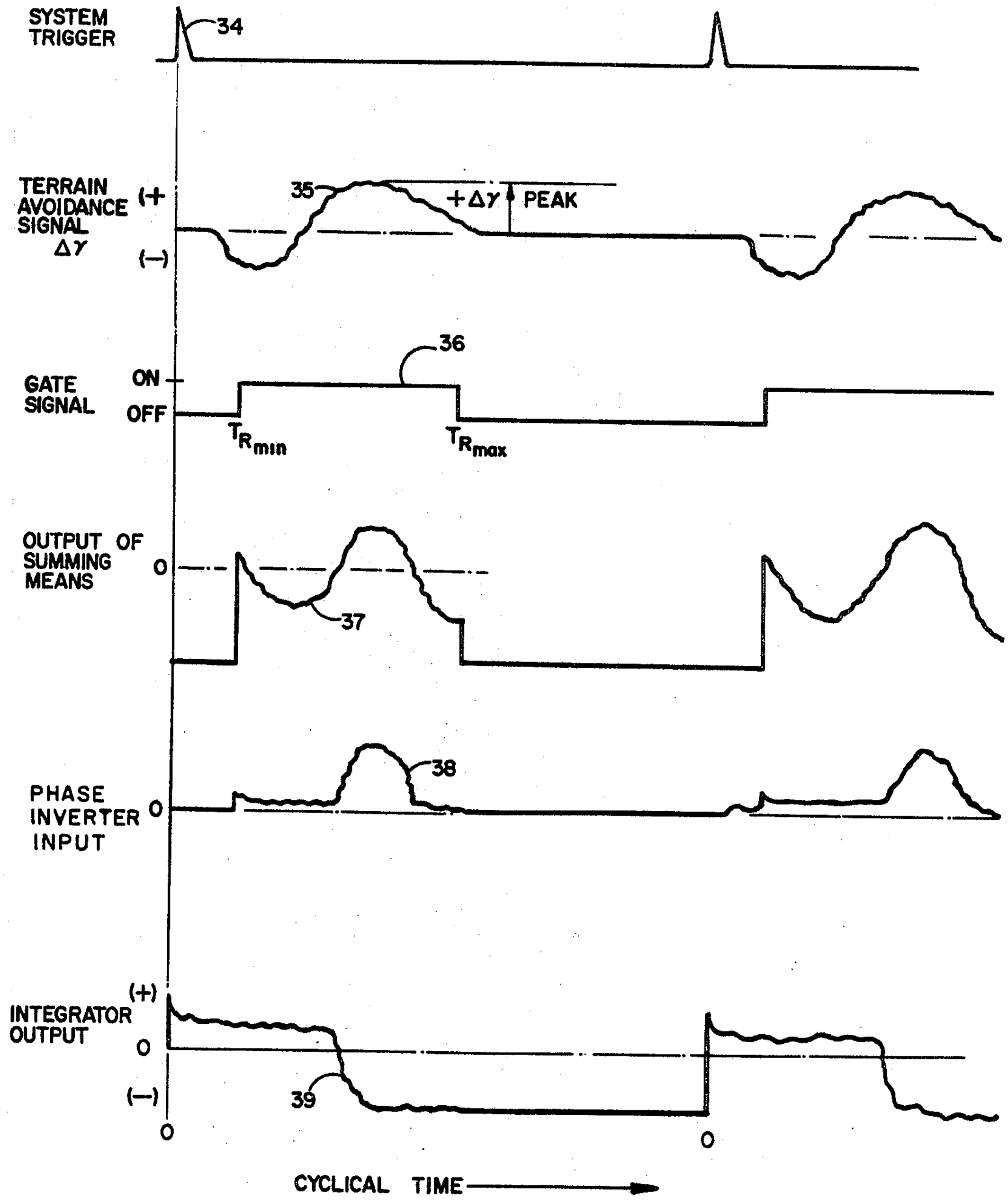
FIGURE 2 is a family of time-histories illustrating the coöperative responses of several elements of FIG. 1 to a selected input.
Figure 3:
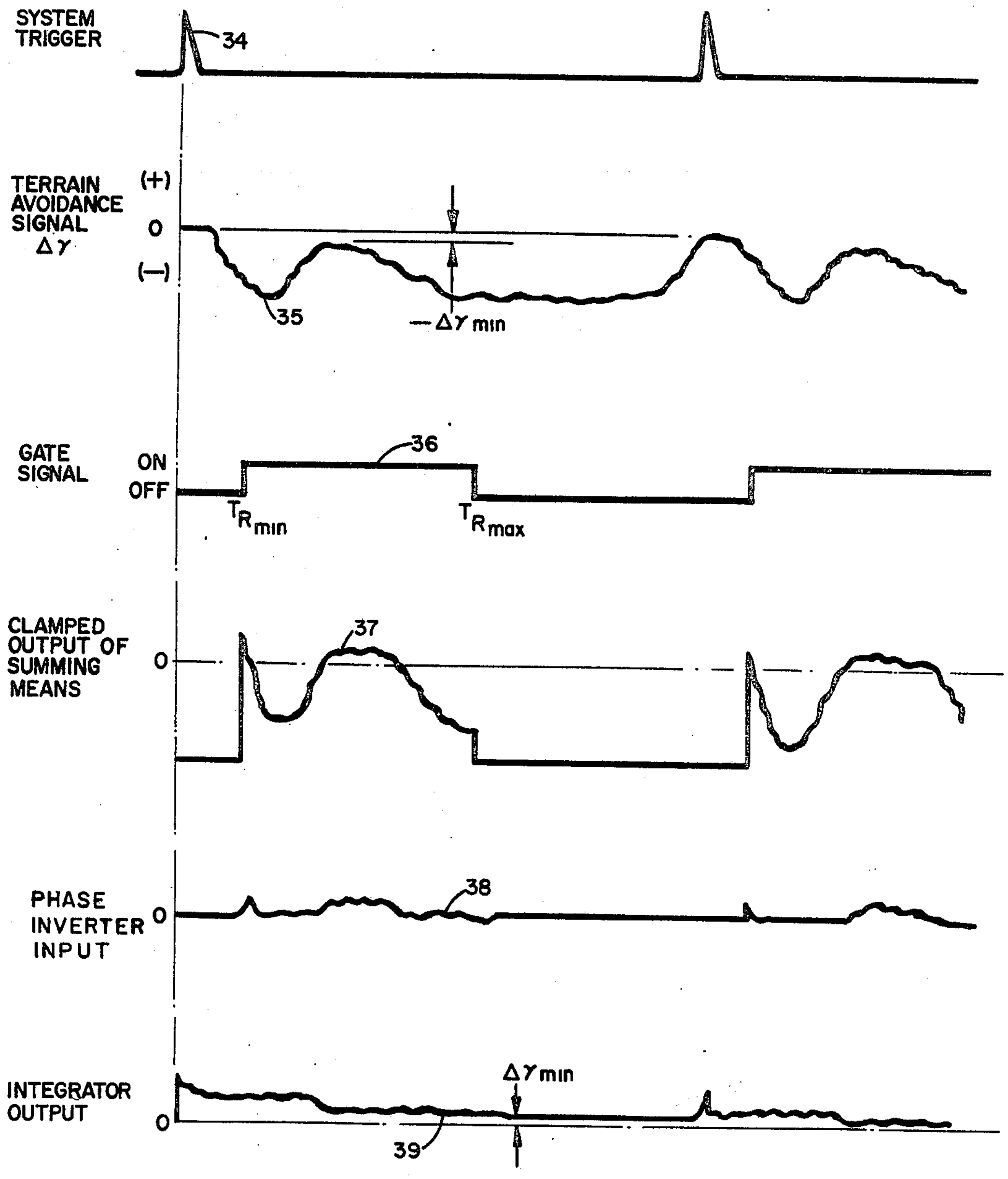
FIGURE 3 is an alternate family of time-histories illustrating the response of the device of FIG. 1 to an alternate form of input.

A purpose of such A-C coupling means is to permit separate clamping and biasing of summing means 10 and integrator 18, as will be more fully appreciated from the description of operation of the device of FIG. 1, in connection with FIGS. 2 and 3. Another purpose of such A-C coupling means is to allow a wide bandwidth response or high cut-off frequency for the device of FIG. 1.

Signal dumping means 22 is provided for periodically reducing the output of integrator 18 to a preselected bias, and is represented schematically by switching means 23 connected across capacitor 18 and actuated in response to a source of a periodic pulse (such as the system trigger of a radar system or other utilizing means). Switch 23 is shown in FIG. 1 in the normally unactuated or "off" position. During the brief actuation period of periodically actuated switch 23, the switch connects integrator 18 to a low impedance source 24 of a positive bias voltage, for reasons which will be made more fully apparent hereinafter.

There is further provided signal clamping means 26 for periodically clamping the summing point 13 of signal summing means 10 to ground (or other selected potential reference) during an interval inclusive of the dumping interval of signal dumping means 22. Signal clamping means 26 is represented schematically in FIG. 1 by switching means 27 and is shown in the unclamped or unactuated position.

Switch 27 is driven by a time-modulator 28 responsive to the input from the periodic system trigger. Time modulator 28 may be comprised of a bistable signalling element 29 in cooperation with a tapped delay line 30. The input of delay line 30 is responsively connected to the system trigger and a first or set (1) input of flip-flop 29 is connected to a first output tap of delay line 30 and a second or reset (0) input of flip-flop 29 is connected to a second successive output tap of delay line 30. A two-state output of flip-flop 29 is fed as a control signal to clamping means 26 for operating switch 27.

Although exemplary means have been shown for driving switch 27, it is to be understood that switch 27 may be driven by any source of a sampling pulse, synchronized to sample the input at terminal 14 for any discrete time interval.

The operation of the device of FIG. 1 may be more readily understood by reference to the time-histories of FIG. 2.

Referring to FIG. 2, there is illustrated a family of time-histories of the cooperation of several elements of the device of FIG. 1, in response to a monopulse radar signal ($\Delta\gamma$) indicative, for example, of a time-varying target angle-off-boresight having a maximum or peak-amplitude of positive sense.

Such a signal is provided, for example, by terrain sensed by an airborne mapping radar, the negative sense of the early radar return representing nearby terrain lying below the declined antenna boresight axis, and the positive sense of the later radar return representing distant terrain lying above the declined boresight axis.

Curve 34 represents the periodic response of the system trigger of a radar system in which the device of FIG. 1 is utilized, which trigger is applied to time modulator 28 and signal dump means 22 of FIG. 1. Curve 35 represents the output signal ($\Delta\gamma$) of the receiver of the utilizing radar, which signal is applied as input to terminal 14 of the device of FIG. 1 as the signal of interest which is to be peak-detected.

Curve 36 represents the output of time modulator 28 (of FIG. 1), which provides a switching control to switch 27 during the interval occurring after a time $t_{R\min}$, corresponding to a preselected minimum radar range of interest; and before $t_{R\max}$, corresponding to a preselected maximum radar range of interest. Curve 37 is the output of summing means 10, showing the clamping of the potential of terminal 13 (of FIG. 1) by signal clamping means 26 (of FIG. 1), in response to the switching control signal from time-modulator 28 (curve 36 of FIG. 2), during the time interval subsequent to $t_{R\max}$ and prior to $t_{R\min}$; and showing the unclamped input to emitter-follower 16 on terminal 13 (of FIG. 1) during the interval subsequent to $t_{R\min}$ and prior to $t_{R\max}$. The shape of the unclamped signal at terminal 13 (curve 37) does not precisely correspond to that of the input applied at terminal 14 (curve 35) due to the addition of the feedback signal fed to terminal 13 by summing resistor 12, as will be explained more fully hereinafter.

Curve 38 represents the clipped input to phase-inverter 20, being only that positive polarity portion of curve 37, the remainder being clipped by the action of clipping diode 19 of FIG. 1. Because of the unipolar nature of the clipped signal, the response of integrator 18 thereto will be a unipolar driving action or direction.

Curve 39 represents the phase-inverted output of integrator 18, showing the unipolar (negative-going) driving action or direction of the output of integrator 18 in response to the unipolar input thereto, and further showing the effect of signal-dumping means 22 (of FIG. 1) in periodically biasing the output of integrator 18 to a polarity or sense opposite to the polarity or sense of the clipped (and phase inverted or negative) input to integrator 18, which biasing or dumping occurs outside of the interval occurring after $t_{R\min}$ and before $t_{R\max}$. In other words, within the clamping period of clamp 26 (curve 36 after $t_{R\max}$ and before $t_{R\min}$), integrator 18 is positively charged a preselected amount, and then during the unclamped operation of emitter-follower 16 (curve 36 after $t_{R\min}$ and before $t_{R\max}$), the output of integrator 18 drives in a negative direction (as indicated by the generally negative slope of curve 39) in response to the clipped input shown by curve 38. Such output (curve 39) of integrator 18 is fed back to terminal 13 (via emitter-follower 17) by summing resistor 12 (of FIG. 1) and combined with the input applied to input terminal 14 to provide the combined input signal to emitter-follower 16 (curve 37).

Because of the unipolar driving action of integrator 18 in cooperation with clipping diode 19, integrator 18 drives to a maximum negative amplitude output in response to the positive peak amplitude of the input on terminal 14 (curve 35), as follows. Because of the sense-inverting action of phase-inverter 20 upon the clipped output of emitter-follower 16, the feedback of the integrator output to terminal 13 constitutes a negative feedback signal thereto. When the positive amplitude of input signal curve 35 drops below the amplitude level of the negative-sensed feedback signal from emitter-follower 17 (curve 39 in FIG. 2), then the sum of the two signals (curve 37 in FIG. 2) will be a signal indicative of the amplitude difference between them and of the negative sense. In view, however, of the clipping action of diode 19 (illustrated by curve 38), integrator 18 (of FIG. 1) does not respond thereto, but instead maintains or stores a signal indicative of the peak value of curve 35, although of opposite sense relative thereto.

At the end of the cyclical time interval $t_{R_{max}}$, indicative of the maximum range of interest, clamping means 26 is actuated by time modulator 28 (in FIG. 1), as indicated by curve 36 at $t_{R_{max}}$, whereby terminal 13 is clamped to a reference potential (curve 37 after $t_{R_{max}}$), and no further change in output is provided by integrator 18.

Under such condition, integrator 18 continues to store the integrated signal until the dumping action of signal dump means 22 in response to the system trigger (curve 34 of FIG. 2) reversely charges the integrator 18, whereby the received radar signals (indicative of target angle $\Delta\gamma$) of the subsequent radar pulse repetition period (applied to terminal 14) may be similarly processed for peak detection (i.e., determination of $+\Delta\gamma$ peak).

Where the signalling period of interest $$(\Delta t = T_{R_{max}} - T_{R_{min}})$$

is small relative to the total pulse repetition period or cycle of the system trigger, then the initially positive-biased interval of the integrator output (curve 39 in FIG. 2) represents a high-frequency, low-energy spectral response which may be effectively filtered out by a low pass filter.

Hence, the schematic arrangement of FIG. 1 comprises means for providing periodic signals indicative of the peak amplitude of a detected signal having a selected (positive) polarity.

The arrangement of FIG. 1 also comprises means for providing periodic signals indicative of the minimum amplitude of a detected signal of an opposite (negative) polarity, as may be more easily understood by reference to FIG. 3.

Referring to FIG. 3, there is provided a family of time-histories similar to those of FIG. 2, and illustrating the response o fthe device of FIG. 1 to input signals of only a negative sense. Curve 35 in FIG. 3 represents an applied input signal $\Delta\gamma$, as in FIG. 2; but with the difference that the $\Delta\gamma$ signal is only of the negative sense. In other words, curve 35 in FIG. 3 is of the same shape as the curve of FIG. 2; but is displaced downwardly or biased negatively, whereby the minimum negative value ($\Delta\gamma_{min}$) in FIG. 3, corresponds to a maximum positive value ($+\Delta\gamma_{peak}$) of FIG. 2. Such a situation would occur, for example, where the altitude of an aircraft utilizing an airborne radar incorporating the circuit of FIG. 1 was increased relative to that existing for the condition producing the signal condition illustrated in FIG. 2.

The corresponding response of the unclamped terminal 13 of FIG. 1 is shown by curve 37 within the interval after $t_{R_{min}}$ and before $t_{R_{max}}$. The positive polarity signal (curve 39 at $t_{R_{min}}$) on integrator 18 (due to the dumping action of signal means 22) is fed back to terminal 13 and combined with the input signal (curve 35) to generate curve 37 (at $t_{R_{min}}$). Until the amplitude of negative-sensed curve 35 falls below the initial stored positive signal (positive portion of curve 39 of FIG. 3) fed back from emitter-follower 17 of FIG. 1, curve 37 is negative valued.

Because of the clipping action of diode 19 (of FIG. 1), the negative portions of curve 37 are not provided as inputs to amplifier 20 of FIG. 1 (null portions of curve 38). As curve 35 in FIG. 3 reduces its negative amplitude (corresponding to the approach of the maximum positive value of FIG. 2), then the difference between the input signal (curve 35) and the feedback signal (curve 39) may become slightly positive (curve 38 in FIG. 3), whereby phase inverter 20 provides a corresponding phase-inverted input to integrator 18, causing the output of integrator 18 to drive in a negative direction (negative slope portion of curve 39 in FIG. 3).

Such negative driving-action of integrator 18 reduces the positive signal output thereof until the amplitude of the positive-sensed feedback signal (on resistor 12 of FIG. 1) equals the amplitude of the negative input signal (on terminal 14), in which event the combined signal level on terminal 13 of FIG. 1 (curve 37) drops from a positive value toward zero.

As the input to integrator 18 drops to zero, the output of integrator 18 ceases to change, being indicative of the minimum value of the negative input signal ($-\Delta\gamma_{min}$ of curve 35).

As the amplitude of curve 35 in FIG. 3 recedes from the ($-\Delta\gamma_{min}$) value and both curves 35 and 37 become increasingly negative, the clipping action of diode 19 (the zero value of curve 38) prevents further input to integrator 18, which latter device continues to store the positive signal (curve 39) indicative of the ($-\Delta\gamma_{min}$) value of curve 35, until the dumping action of signal means 22 occurs in response to the system trigger (curve 34 of FIG. 3), as explained in connection with FIG. 2.

Hence, it is to be appreciated that the schematic arrangement of FIG. 1 provides means for indicating, alternatively, the peak amplitude of a signal of a selected polarity and the minimum amplitude of a signal of the opposite polarity. That is to say, the device of the invention provides closed-loop means for indicating a peak deviation from a preselected reference (i.e., the dump signal reference source 24 of FIG. 1).

Figure 4:
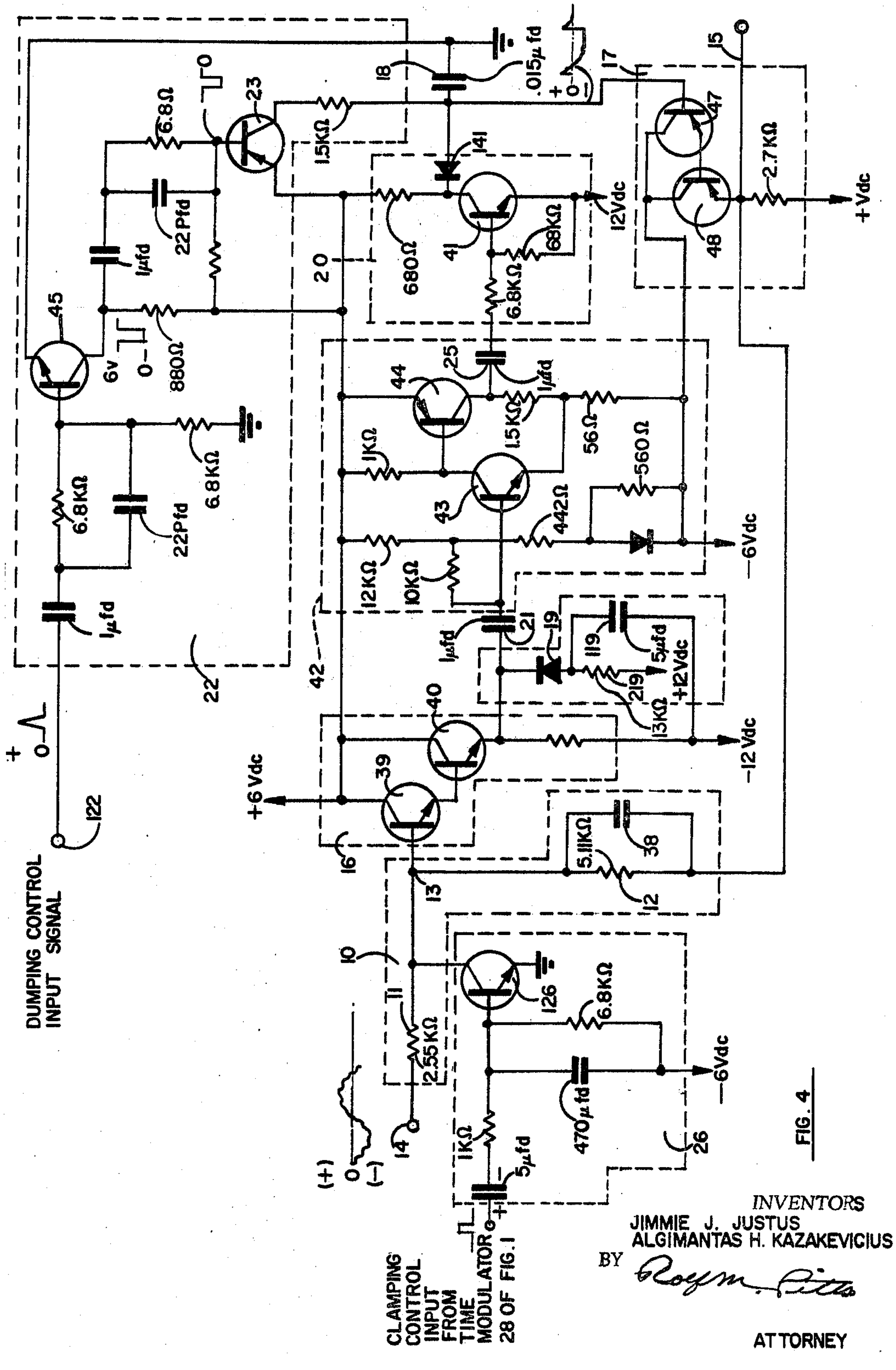
FIGURE 4 is a circuit diagram of a preferred embodiment of the device of FIG. 1.

In a practical application of the device illustrated by the schematic arrangement of FIG. 1 to the sampling of periodic signals for systems having high pulse repetition frequencies (PRF's), such as in pulsed radar systems, suitable high-speed switching circuits for signal clamping and signal dumping need be provided, as shown in FIG. 4.

Referring to FIG. 4, there is illustrated a preferred embodiment of the schematic arrangement of FIG. 1, adapted for the peak detection of periodic signals occurring with the periodicity of 1300 microseconds usual with present radar systems.

There are provided elements 10, 14, 15, 16, 17, 18, 19, 20, 21, 22, 25, and 26 arranged to generally cooperate similarly as like referenced elements of FIG. 1, but with minor differences as noted hereinafter. The indicated circuit values relate to those employed in an exemplary circuit successfully tested and observed to perform the desired function of alternatively peak-detecting a periodic signal having a peak amplitude of a selected sense, and a minimum amplitude of a sense opposite the selected sense.

Where the bipolar video input signal applied to input terminal 14 is superimposed upon, or biased by, a positive voltage pedestal (as shown by curve 35 in FIG. 7), then terminal 13 of summing means 10 in FIG. 4 may be periodically clamped to ground by means of the switching transistor 126 of clamping switch 26, rather than being clamped to a negative potential as shown in the arrangement of FIG. 1.

In the summing means 10 of FIG. 4, a capacitor 38 is added in parallel with feedback summing resistor 12 in order to provide compensation for time lags in the system and to assure closed-loop stability, as is well understood in the art of closed-loop circuit design.

Emitter-follower 16 in FIG. 4 is comprised of first and second transistors 39 and 40 connected in tandem, a clipping diode 19 being connected across the output of second transistor 40. Diode 19 is maintained within a half-volt of the ground potential by the cooperation of periodically clamped terminal 13 (coupled through emitter-follower 16 to diode 19) and the RC network of elements 119 and 219. Hence, diode 19 as poled, clips or shunts negative going pulses, similarly as the arrangement of FIG. 1.

Figure 7:
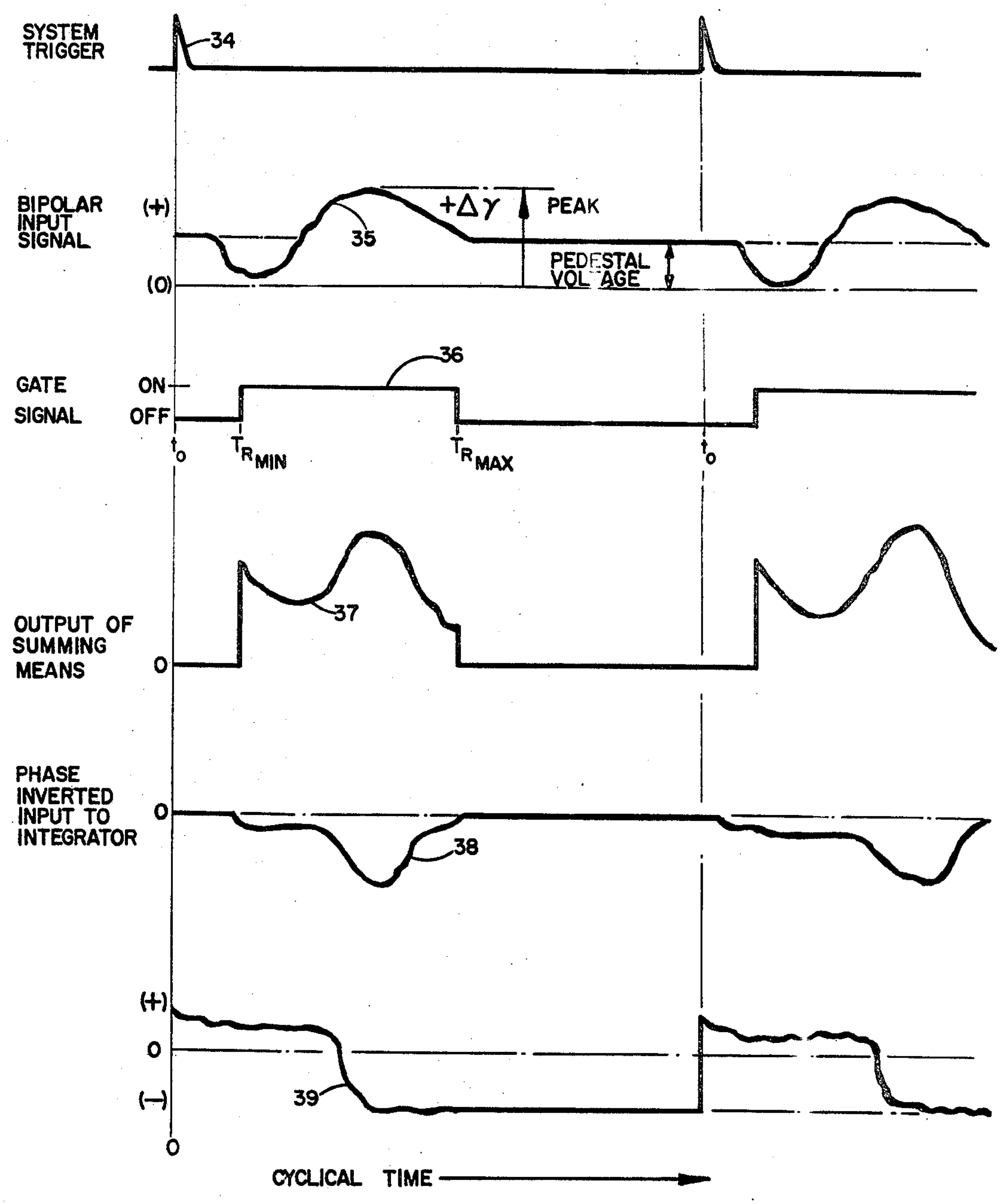
FIGURES 7 and 8 are families of time histories of the respective responses of the arrangements of FIGS. 4 and 6.

Signal-inverter 20 is comprised of transistor 41, and is A-C coupled to the clipped output of emitter-follower 16 by means of an amplifier 42 (comprising fifth and sixth transistors 43 and 44) and coupling capacitors 21 and 25. The response of inverter 20 to the clipped emitter-follower output (fed as an input to integrator 18 in FIG. 4) is illustrated as curve 38 in FIG. 7, while the negative-driving response of integrator 18 is shown in FIG. 7 as curve 39.

Signal dumping means 22 for "dumping" signals stored by integrating capacitor 18, in response to dumping pulses of positive polarity, is comprised of seventh transistor 45 and switching transistor 23. Such response serves to "dump" the negative-driving response of integrator 18 to a reference potential of positive polarity.

Capacitor 18 is coupled to output transistor 41 of inverter 20 by means of negatively-poled diode 141, so as to allow negative charging of capacitor 18 in response to a like-poled output from inverter 20, while also preventing inadvertent discharging of negatively charged capacitor 18. Under the application of a dump signal at terminal 122 of dump means 22, normally non-conductive transistor 23 becomes conductive, thereby applying a positive potential to the ungrounded plate of capacitor 18 (which response is illustrated as curve 39 at zero ($t_0$) cyclical time in FIG. 7).

Output emitter-follower 17, coupled across capacitor 18, is comprised of ninth and tenth transistors 47 and 48.

The arrangement of FIG. 4, with the associated circuit values illustrated therefor, has been observed to demonstrate an adequate response to signals within a bandwidth as high as 10 megacycles per second, as to be entirely suitable for use in airborne mapping or azimuth-scanning radars and the like wherein a display of peak-detected terrain obstacles as a function of azimuth is provided, whereby a pilot or observer may be enabled to select as azimuth direction or course line avoiding the maximum-height terrain obstacles.

In the practical utilization of such peak-detected signal, it is preferable to filter the same by means of, say, a first order low-pass R-C network having a time constant representing a break frequency much less than the pulse repetition frequency (PRF) of the system trigger of FIG. 1 and much higher than the antenna scanning frequency. In this way the desired sampled signal is transmitted without transmitting an excessive amount of noise, while also avoiding signal "smear" due to combining signals occurring at different azimuths.

Where, for example, the pulse repetition rate of the radar is 400 c.p.s. and the antenna azimuth scan rate of 1 c.p.s., a representative time constant of an associated output filter for the device of FIG. 4 would be ($\frac{1}{2}\pi$ 40 c.p.s.$\approx\frac{1}{240}$ c.p.s.) or about .004 second.

Alternatively, where used in an airborne radar system the orientation of a directional antenna of which is maintained in the azimuth direction of the vehicle flight path, the output of the device of FIG. 4 may be used to provide pitch maneuvering signals to the pitch axis of a flight controller. However, in a multimode radar, having an azimuthal scanning antenna for mapping purposes, such flight control signals for a selected azimuth or flight line direction of interest may be obtained by employing an azimuth-gated second peak-detector responsively coupled to the first peak-detector, as shown in FIG. 5.

Figure 5:
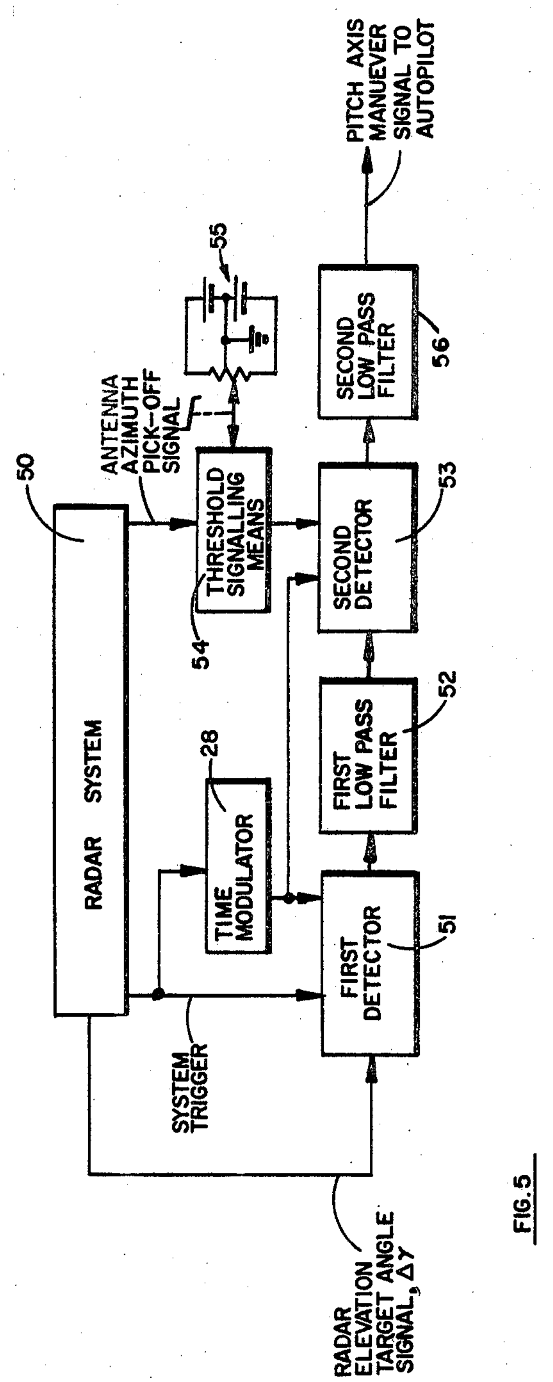
FIGURE 5 is a block diagram of radar signal processing means employing the device of the invention.

Referring to FIG. 5, there is illustrated a schematic arrangement in block diagram form of means for processing the radar video signals of a mapping or azimuthal scanning radar to provide a pitch maneuvering signal indicative of a maximum pitch-up maneuver or minimum pitch-down maneuver for low altitude penetration, terrain-following flight missions. A radar system 50 provides several output signals including a first periodic signal being indicative of the elevation as a function of radar-time or range-distance of a detected target, a second periodic signal representing the system trigger of system 50 and a third signal indicative of the azimuth direction or orientation of a directional antenna of system 50. The construction and arrangement of radar systems being known and not constituting an element of the invention, radar system 50 is shown in block form only. There is provided a first detector 51 and time modulator 28 arranged to cooperate with the system trigger and the radar target angle signal of radar 50 in the manner of the schematic arrangement of FIG. 1, the detail construction and arrangement of detector 51 corresponding to that illustrated in FIG. 4.

A low pass filter 52 having a cut-off frequency equal to the radar-system PRF is coupled to the output of detector 51 to smooth the video output signal therefrom. Such smoothed peak-detected signals are fed to a second detector 53. Second detector 53 is functionally distinguishable from first detector 51 in that, in addition to being unclamped within a range-time interval of interest (occurring within the system pulse repetition period) by clamping means responsive to time modulator 28, second detector 53 is also coincidence-gated by a signal indicative of a preselected azimuth corresponding, for example, to the heading of the utilizing aircraft. Hence, the output of second detector 53 is indicative alternatively of a maximum signal of a selected polarity or a minimum signal of the opposite polarity occurring due to radar targets within a preselected range and at a selected direction or heading.

Such azimuth gating signal may be generated by threshold signalling means 54 responsive to an antenna azimuth pick-off signal (from radar system 50) and a source 55 of a selected azimuth reference signal (of opposite sense to the azimuth signal of interest). When the difference between the azimuth pick-off signal and the azimuth reference source falls below a selected threshold, then the output state of the signalling device 54 is changed, providing an azimuth gating signal to second detector 53. When source 55 is arranged to provide a reference signal of opposite sense or polarity to the azimuth pick-off signal of interest, then the two signals may be directly summed, and the sum compared against a selected threshold value by signalling means 54. In such case, signalling means 54 may be comprised of a comparator, the construction and arrangement of which is well known to those skilled in the art, an exemplary arrangement of which being described for example in FIG. 6.27a at page 298 of "Electronic Analog Computers" (second edition), by Korn and Korn, published by McGraw-Hill (1956).

Conventionally, the flight reference line (FRL) or heading direction of the utilizing vehicle is the heading of interest where corresponding to the course line direction or flight path azimuth. However, in a heavy crosswind, the drift angle then becomes of interest, in which case element 55 represents the output of a drift angle computer.

The output of second detector 53 may be filtered or smoothed by a second low-pass filter 56 to assure an adequately smoothed analog control signal for use by a flight controller or other utilizing means. Such filter 56 preferably would not require as large a bandwidth as that of first filter 52; however, the pass band would be at least as high, for example, as the band pass of the utilizing flight controller frequency response, but substantially below the antenna scanning frequency of radar system 50.

Figure 6:
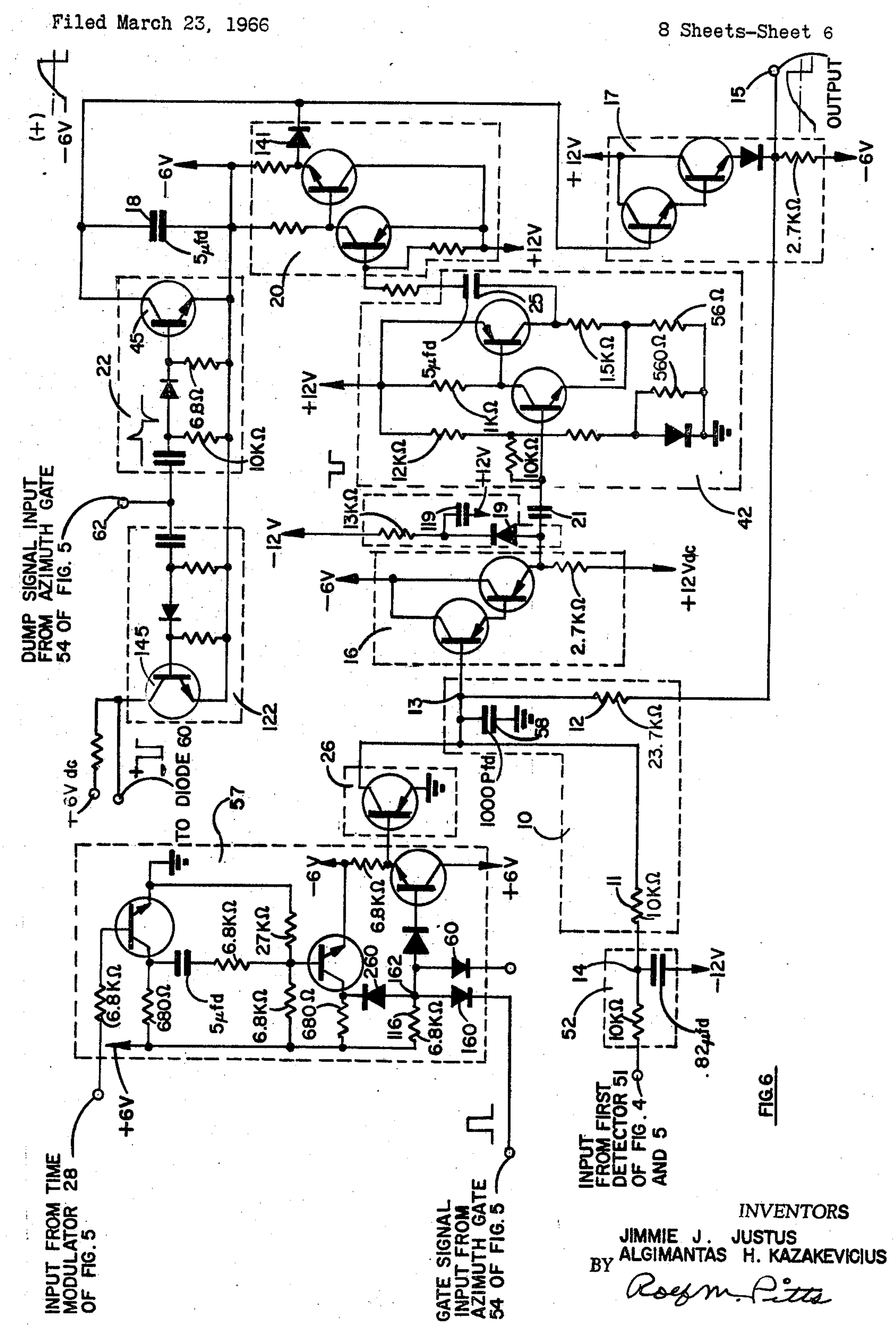
FIGURE 6 is a circuit diagram of a preferred arrangement of the second detector of FIG. 5.

A preferred arrangement of the second detector 53 is shown in FIG. 6.

Figure 8:
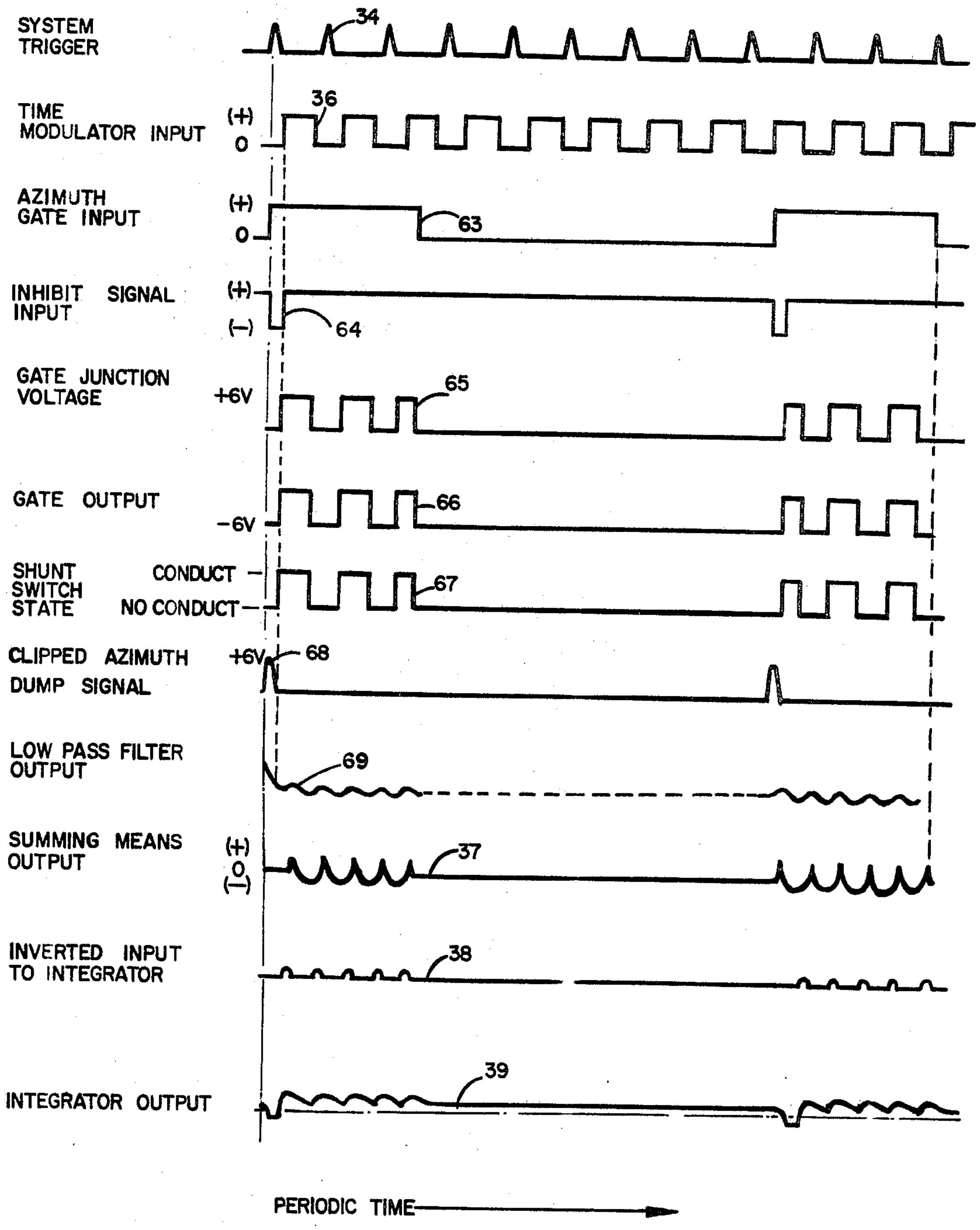

Referring to FIG. 6, there is illustrated a schematic circuit of a preferred arrangement of second detector 53 of FIG. 5. There is provided summing means 10, first and second emitter-followers 16 and 17, integrating capacitor 18, signal clipper 19, inverter 20, signal dumping means 22, signal clamping means 26 and A-C coupled amplifier 42 arranged to generally cooperate substantially the same as like referenced elements of FIG. 4, the control input of dump gate 22 adapted to be responsively connected, however, to the azimuth gating signal or output of signalling means 54 of FIG. 5. (shown as curve 63 in FIG. 8). Further, a differentiating R-C network and clipping diode are interposed between the input terminal 62 and switching transistor 45 of dump gate 22, whereby dump gate 22 responds only to the leading edge of the azimuth gating signal (which response is shown as curve 68 in FIG. 8). A similarly arranged R-C network and similarly poled diode cooperate between input terminal 62 and a second switching transistor 145 to comprise an inhibit gate 122. Such gate responds to the leading edge of the azimuth gating signal (curve 63 in FIG. 8) to provide a negative going pulse (curve 64 in FIG. 8), for reasons which will be explained more fully hereinafter.

Also, interposed between input terminal 14 of summing means 10 (of FIG. 6) and the output of first detector 51 (of FIGS. 4 and 5) is a low pass R-C network 52 corresponding to element 52 of FIG. 5. In view of the low-frequency spectral content of the input provided by filter 52, the values of the circuit elements of second detector 53 of FIG. 5, as illustrated in FIG. 6, need not be selected to provide the same closed-loop high-frequency response as the device of FIG. 4. For this reason the equalizing capactior 38, connected in circuit with feedback resistor 12 in the arrangement of FIG. 4, is omitted in the arrangement of FIG. 6.

There is further included in the arrangement of FIG. 6, an "AND" gate or coincidence gating means 57 interposed between the output of time modulator 28 (of FIG. 5) and the input to clamping means 26, and responsively connected to the source 54 of the azimuth gating signal. The negative-going pulse output of transistor 145, developed in response to the leading edge of the control pulse applied to dump gate input terminal 62 may also be applied as an inhibit input to gate 57, whereby unclamping of terminal 13 by the cooperation of gate 57 and switch 26 is delayed until after the dumping of integrator 18 by dump gate 22. Such inhibit signal input may be applied, for example, to diode 60 of gate 57. In normal operation of the clamping element 26 of FIG. 6, terminal 13 (of summing means 10) is unclamped during the coincidence of the azimuth gating signal and the "unclamp" state of the clamping signal. In the cooperation of element 57 (of FIG. 6) as an AND gate, the common junction 162 of diodes 60, 160 and 260 forms an AND junction. The regular conduction from the +6 v. supply terminal to the gate signal input terminal (indicated as connected to gate 54 of FIG. 5) provides an IR drop through the supply resistor 116 connected to junction 162 (shown as curve 65 in FIG. 8) so as to provide a non-conductive input state to the output stage transistor (of gate 57), thereby maintaining shunt switch 26 in a conductive state (shown by curve 67 in FIG. 8), corresponding to a logic state "OFF" for terminal 13. Upon the application of an incremental change of positive sense of the gate signal from gate 54, the associated AND diode 160 is back-biased; while upon the application of a positive pulse input from modulator 28 (of FIG. 5) to element 57, diode 260 becomes back biased. Upon the concurrent back-biasing of diodes 60, 160 and 260, the IR drop through AND junction resistor 116 is reduced, thereby raising the applied potential at the base of the output transistor of block 57, resulting in a change of state of switch 26 to a non-conductive state, corresponding to a logic "ON" condition for terminal 13. In other words, a common state of curves 63, 64 and 65 in FIG. 8 result in corresponding states for curves 66 and 67 in FIG. 8.

Because of the signal spike or transient transmitted to terminal 13 through clamp 26 from gating means 57, a shunt capacitor 58 is connected across the output of summing means 10 to attenuate such signal spike.

Hence, in normal operation of the closed loop arrangement of FIG. 6, summing means 10 is unclamped and responsive to inputs applied to input terminal 14 during a preselected time interval corresponding to a radar range of interest, and further corresponding to the orientation of the directional radar antenna in a selected direction. Clipping diode 19 and capacitor 119 cooperate with periodically clamped terminal 13 to provide clipping relative to a ground potential, similar to the arrangement of FIG. 4. However, diode 19 in FIG. 6 is poled to clip positive pulses. The remaining negative going pulses are phase inverted by amplifier 20 as a positive sense input to integrator 18 (shown as curve 38 in FIG. 8). Integrating capacitor 18 cooperates with the circuit of FIG. 6 to provide a unidirectionally driving output in like manner as the device of FIG. 4. A positive poled diode 141 is interposed between the output transistor of inverter 20 and capacitor 18 to allow positive charging of capacitor 18, while preventing inadvertent discharging thereof. The output of capacitor 18 (shown as curve 39 in FIG. 8) is coupled to output terminal 15 by means of emitter follower 17. Accordingly, an output signal is provided on terminal 15 which is indicative of the peak deviation of an input signal (applied to input terminal 14) from a preselected reference potential periodically switched across capacitor 18 by switching transistor 45 (in response to dump signal 68 in FIG. 8). In other words, for a selected heading direction an output signal is provided on output terminal 15 (of FIG. 6) which is indicative alternatively of a maximum positive or upward maneuvering signal and a minimum downward maneuvering signal. By means of such output signal, an autopilot or display indicator or other utilizing device may be employed in safely controlling an aircraft in performing a low altitude or terrain-following mission.

Accordingly, there has been described improved means responsive to bipolar video signals for providing an output indicative alternatively of a maximum or peak-detected amplitude of a selected polarity or a minimum detected amplitude of the opposite polarity for said video signals.

Although the invention has been described in terms of means for providing a D-C maneuvering signal in response to a radar-sensed periodic terrain-angle signal, the scope of the invention is not so limited. The device of the invention is equally useful for the generation of a steady-state analog signal indicative of a peak periodic signal or sampled signal. Hence, the device may be employed in cooperation with a digital voltmeter or the like to provide an extremely accurate measurement of such sampled signal. In this way periodic signals may be measured in a more reliable manner than by the use of a manually operated cathode ray tube device relying upon the skill (or subject to the lack of skill) of a human operator. Further, the gated signal sampling means of the invention lends itself to incorporation in automated signal apparatus for the sampling and measurement of a plurality of signals of multiple-channel signalling means such as a complex system to be monitored.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A closed-loop input-voltage peak detector for providing a bipolar output voltage, comprising:

unipolar-driving and integrating means for providing a phase-inverted output; and periodic clamping means for synchronously clamping an input and output of said unipolar-driving and integrating means periodically to mutually exclusive reference potentials, the polarity of the reference potential for said output of said unipolar-driving and integrating means being opposite to the polarity of a unipolar driving direction of said unipolar-driving and integrating means.

2. In a video signalling system having a system trigger, negative feedback means for providing a peak-detected analog output of a periodic input, comprising:

signal summing means responsive to said output and input;

signal inverting and integrating means for providing the output;

unidirectional conducting and A-C coupling means interconnecting an output of said signal summing means and an input of said signal inverting and integrating means; and signal clamping means responsive to the system trigger of said said signal inverting and respective outputs of said summing means and said signal inverting and integrating means to unipolar reference levels of mutually opposed polarities.

3. In a video signalling system, means for providing a peak-detected analog of a video input, comprising:

signal summing means;

signal inverting and integrating means;

unipolar signal clipping and A-C coupling means interconnecting an output of said signal summing means and an input of said integrating means, a first and second input of said signal summing means being responsively connected to an output of said integrator and adapted to be connected to a source of a video input signal, respectively;

signal dumping means for periodically restoring the output of said integrating means to a first unipolar reference potential having a polarity opposed to that of the unipolar signal clipping function of said coupling means; and signal clamping means for periodically clamping said output of said summing means to a second unipolar reference potential having a polarity opposed to that of said first reference potential during an interval including the interval of said periodic signal dumping.

4. In a video signalling system, means for providing a peak-detected analog of a video input, comprising:

signal summing means;

phase inverting and signal integrating means having an output terminal;

unidirectional conducting means interconnecting an output of said signal summing means and an input of said phase inverting and integrating means, whereby only unipolar input signals are applied to the input of said phase inverting and integrating means, said summing means being responsively connected to said output terminal and adapted to be connected to a source of a video input signal;

signal dumping means for periodically restoring an output of said phase inverting and integrating means to a reference potential;

signal clamping means for periodically clamping said output of said summing means to a reference potential during an interval including the interval of said periodic signal dumping;

the polarity of said dumped signal applied to said summing means being reversed relative to the polarity of the unipolar input to said phase inverting and integrating means.

5. In a video signalling system having a pulse repetition frequency, means for providing a control signal indicative of the peak amplitude of a video input signal, comprising:

a first peak detector;

a first low-pass filter responsively connected to an output of said first peak detector and having a bandpass not inclusive of the pulse repetition frequency of said video signalling system;

a gated second peak detector responsively connected to said first filter for providing gated peak detected signals; and a second low-pass filter responsively connected to an output of said gated peak-detector and having a bandpass substantially less than the bandpass of said first filter;

whereby an analog control signal is provided for control of an element to be controlled whose dynamic response bandpass is substantially less than that of first low-pass filter.

6. The device of claim 5 in which each said peak detector comprises:

signal integrating means;

signal comparison means responsively connected to an output of said integrating means and adapted to be connected to a source of said video input signal, for providing an output indicative of the difference therebetween, an input of said integrating means being responsively connected to the output of said comparison means; and unidirectional conducting means interposed in circuit between the output of said comparison means and the input of said integrating means.

7. The device of claim 5 in which said first and gated second peak detectors are closed loop peak detectors.

8. The device of claim 7 in which each said closed-loop peak detector comprises:

signal integrating means;

signal comparison means responsively connected to an output of said integrating means and adapted to be connected to a source of said video input signal, for providing an output indicative of the difference therebetween, an input of said integrating means being responsively connected to the output of said comparison means; and unidirectional conducting means interposed in circuit between the output of said comparison means and the input of said integrating means, whereby the input of said integrating means is substantially unipolar.

9. The device of claim 7 in which said first closed-loop peak detector includes signal dumping means for periodically reducing the output thereof to a bias reference having a polarity opposite that of a unipolar input to said integrating means.

10. In a video signalling system, negative feedback means for providing a peak-detected analog of a video input, comprising:

signal summing means;

phase-inverting and D-C signal integrating means;

unidirectional conducting means interconnecting an output of said signal summing means and an input of said phase-inverting and integrating means;

said signal summing means being responsively connected to an output of said phase-inverting and integrating means and adapted to be connected to a source of a video input signal;

signal dumping means for periodically reversing the polarity of the output of said phase-inverting and integrating means relative to the input thereto; and means for periodically clamping said ouput of said summing means to zero potential during an interval which includes the interval of said periodic signal dumping.

11. In a video signalling system, means for providing a peak-detected analog of a video input, comprising:

signal summing means;

phase-inverting and D-C signal integrating means;

unidirectional conducting means interconnecting an output of said signal summing means and an input of said phase-inverting and integrating means; said signal summing means being responsively connected to an output of said phase-inverting and integrating means and adapted to be connected to a source of a video input signal;

signal dumping means for periodically reducing the output of said phase-inverting and integrating means to a preselected bias; and means for periodically clamping said output of said summing means to zero potential during an interval which includes the interval of said periodic signal dumping;

the polarity of said integrated signal applied to said summing means being reversed relative to the polarity of the input of said phase-inverting and integrating means.

References Cited

UNITED STATES PATENTS

| | | | |
|---|---|---|---|
| 2,840,707 | 6/1958 | Johnson | 328—151 |
| 3,119,984 | 1/1964 | Brandt et al. | 328—151 XR |
| 3,207,998 | 9/1965 | Corney et al. | 328—151 XR |
| 3,355,719 | 11/1967 | Fox | 328—151 XR |
| 3,375,501 | 3/1968 | McCutcheon et al. | 328—151 XR |

JOHN S. HEYMAN, Primary Examiner

JOHN ZAZWORSKY, Assistant Examiner

U.S. Cl. X.R.

235—183; 307—235; 328—127; 343—7

PO-1050
(5/69)

UNITED STATES PATENT OFFICE
CERTIFICATE OF CORRECTION

Patent No. 3,491,304 Dated January 20, 1970

Inventor(s) J. J. Justus et al

It is certified that error appears in the above-identified patent and that said Letters Patent are hereby corrected as shown below:

Column 11, Claim 2, line 15, delete "said signal inverting and" and insert --- video signalling system for periodically restoring the ---.

SIGNED AND
SEALED
OCT 20 1970

(SEAL)
Attest:

Edward M. Fletcher, Jr.
Attesting Officer

WILLIAM E. SCHUYLER, JR.
Commissioner of Patents